(12) United States Patent
Kazerani et al.

(10) Patent No.: US 10,491,509 B2
(45) Date of Patent: *Nov. 26, 2019

(54) APPLICATION CONTROLLED PATH SELECTION OVER DIFFERENT TRANSIT PROVIDERS

(71) Applicant: Verizon Digital Media Services Inc., Playa Vista, CA (US)

(72) Inventors: Alexander A. Kazerani, Santa Monica, CA (US); Amir Reza Khakpour, Santa Monica, CA (US); Kyle Duren, Los Angeles, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,832

(22) Filed: Jul. 19, 2018

(65) Prior Publication Data

US 2018/0324084 A1    Nov. 8, 2018

Related U.S. Application Data

(63) Continuation of application No. 14/679,266, filed on Apr. 6, 2015, now Pat. No. 10,033,628.

(51) Int. Cl.
| | |
|---|---|
| *H04L 12/707* | (2013.01) |
| *H04L 12/741* | (2013.01) |
| *H04L 12/721* | (2013.01) |
| *H04L 12/725* | (2013.01) |

(52) U.S. Cl.
CPC ............ *H04L 45/22* (2013.01); *H04L 45/306* (2013.01); *H04L 45/70* (2013.01); *H04L 45/74* (2013.01)

(58) Field of Classification Search
None
See application file for complete search history.

(56) References Cited

U.S. PATENT DOCUMENTS

| | | |
|---|---|---|
| 8,111,649 B1 | 2/2012 | Agarwall et al. |
| 2006/0039335 A1 | 2/2006 | Ono et al. |
| 2006/0050719 A1 | 3/2006 | Barr et al. |
| 2006/0114916 A1 | 6/2006 | Vasseur et al. |
| 2006/0268747 A1 | 11/2006 | van Haalen et al. |

(Continued)

*Primary Examiner* — Saba Tsegaye
(74) *Attorney, Agent, or Firm* — Ansari Katiraei LLP; Arman Katiraei; Sadiq Ansari (57) ABSTRACT

Some embodiments move the task of selecting between different transit provider paths from the network level to the application level. Some embodiments perform network level configurations involving a destination network router advertising over a first transit provider path, a unique first address identifying a destination network server as reachable via the first path and advertising over a second transit provider path, a unique second address identifying the destination network server as reachable via the second path. Some embodiments further perform application level configurations involving a source network server passing a first packet to the destination network server over the first path by addressing the first packet to the first address and passing a second packet to the destination network server over the second path by addressing the second packet to the second address. The path selection may be based on policies accounting for congestion, performance, and other metrics.

17 Claims, 10 Drawing Sheets

(56) References Cited

U.S. PATENT DOCUMENTS

| | | | |
|---|---|---|---|
| 2009/0190481 A1 | 7/2009 | Kobayashi et al. | |
| 2009/0225650 A1* | 9/2009 | Vasseur | H04L 41/0668 370/218 |
| 2011/0080911 A1 | 4/2011 | Guichard et al. | |
| 2011/0249659 A1 | 10/2011 | Fontaine et al. | |
| 2012/0023178 A1 | 1/2012 | Drevon et al. | |
| 2012/0230343 A1* | 9/2012 | Schrum, Jr. | H04L 12/5692 370/401 |
| 2014/0133360 A1* | 5/2014 | Chiueh | H04L 41/12 370/256 |
| 2014/0195686 A1 | 7/2014 | Yeager et al. | |
| 2014/0204755 A1 | 7/2014 | Liu et al. | |
| 2016/0248663 A1 | 8/2016 | Patel et al. | |
| 2016/0294672 A1 | 10/2016 | Sella et al. | |

\* cited by examiner

APPLICATION CONTROLLED PATH SELECTION OVER DIFFERENT TRANSIT PROVIDERS

CLAIM OF BENEFIT TO RELATED APPLICATIONS

This application is a continuation of U.S. nonprovisional application Ser. No. 14/679,266 entitled "Application Controlled Path Selection Over Different Transit Providers", filed Apr. 6, 2015, now U.S. Pat. No. 10,033,628. The contents of application Ser. No. 14/679,266 are hereby incorporated by reference.

BACKGROUND INFORMATION

Transit providers interconnect the networks that collectively form the Internet by providing the paths that allow one network to directly or indirectly exchange traffic with other networks. To provide a path, a transit provider typically operates a set of routers or network circuits that connect and allow for intercommunication between one network and another. A transit provider typically operates the routers along its paths, although the transit provider may sometimes leverage routers of other transit providers to complete a path, whereby relationships between the transit providers allow them to pass traffic on one another's routers or circuits. Some transit providers include NTT Communications, Tata Communications, Telefonica, TeliaSonera, and Verizon.

The term "path" can be defined to be any arbitrary set of routers or hops under control of a common transit provider through which a source operating within a first network can reach a destination operating within a second network. When different packets are sent from the source to the destination over a transit provider path, the packets can traverse different sets of routers or hops that are under control of the transit provider. The term "transit" refers to a specific path or a specific set of routers or hops under control of a common transit provider through which the source operating within the first network can reach the destination operating within the second network. In other words, when different packets are sent from the source to the destination over a specific transit, the packets traverse the same set or routers or hops. These terms will be used interchangeably in the following disclosure.

Network operators including, for example, content delivery networks (CDNs), cloud service providers, and other content providers, establish peering relationships with two or more transit providers so that they have multiple paths over which they can pass traffic to a destination. The multiple paths provide the content provider with failover options in the event that the path of one transit provider fails or performance along that path is degraded. For instance, if a content provider is unable to reach a destination over a first transit provider's path, the content provider can transition to a second transit provider's path in order to reach the destination through the alternate path.

Routers, by operation of the Border Gateway Protocol (BGP), control path selection for traffic that exits one network and is intended for another external network. Therefore, in standard network routing, path selection is obfuscated from and not available at the application level. Consequently, servers operating behind the router have no control over which of several available paths the router will pass server generated traffic.

A BGP compliant router performs path selection based on route advertisements it receives from neighboring BGP compliant routers. Although the BGP compliant router may be aware of different transit provider paths to a given destination, the BGP router usually selects the same path that it believes to be the most optimal to the destination based on the received advertisements. The BGP router may not deviate from the optimal path until that path fails or is no longer available.

There are several disadvantages to this standard BGP method of operation. First, BGP path selection can lead to unbalanced utilization of the available paths. One path can receive heavy traffic load, thereby causing that path to become congested and ultimately underperform relative to other unused and underutilized paths. Second, the BGP update messages do not advertise performance metrics so as to identify path performance from one endpoint to another. Instead, the BGP update messages identify the number of hops or routers separating a source network from a destination network. As a result, the BGP selected path, although containing fewer hops, may actually provide worse performance (e.g., greater latency, more packet loss, etc.) than another available path. The server sending the traffic has no control over the path selection and its content delivery performance can suffer as a result of BGP controlling the path selection at the network or router level rather than offering such controls at the application or server level. Third, BGP may be unable or slow to respond to certain failures. Since a BGP router receives advertisements from only its neighboring routers, it may take time for a router failure at one end of a path to propagate through to all other routers along the path. In the meantime, BGP routers can route traffic along the failing path with that traffic ultimately being undelivered to its intended destination. Stated differently, a BGP router does not know the full end-to-end connectivity of a path, and therefore, may be slow to respond to any problems occurring to routers that are not direct neighbors.

Some routers provide policy-based routing controls. The policy-based routing controls incorporate additional intelligence in the BGP router path selection determination. However, a network operator can configure policy-based controls only on the routers the network operator controls. Thus, the network operator may configure its router to send traffic to a first hop along a faster first path to a destination, however the router at the first hop may switch the traffic to a second hop along a slower or unresponsive second path, thereby defeating the ability of the network operator to control path selection. Another shortcoming is that the policy-based routing controls are only implemented in one direction, specifically when sending traffic from the network operator to a destination. Any traffic sent from the destination back to the network operator will not be subject to the same policy-based controls, as the network operator typically has no control over the routers at the destination end of the transit provider path.

As content providers and CDNs strive to optimize all aspects of content delivery, it is desirable for them to also gain control over path selection. Accordingly, there is a need to provide path selection control at the application or server level rather than at the network or router level. There is further a need to apply any path selection optimizations in a bidirectional manner. In summary, there is a need to override BGP without disabling BGP or router intercommunication via BGP.

BRIEF DESCRIPTION OF THE DRAWINGS

A preferred embodiment of methods and systems for application controlled path selection over different transit providers will now be described, by way of example only, with reference to the accompanying drawings in which.

DETAILED DESCRIPTION OF PREFERRED EMBODIMENTS

In an effort to provide servers with more control over end-to-end network performance, some embodiments provide methods and systems that move the task of selecting between different available transit provider paths from the network or router level to the application or server level. This is accomplished by advertising from a destination network gateway router a different address prefix for each path of a different transit provider connecting the destination network to a source network. At the application level, a client or server machine operating in the first network selects a path over which to send a packet to the destination network by specifying the packet destination address to be an address within the address prefix advertised for the selected path. In some embodiments, the application level path selection is based on configurable policies. The policies can provide any desired distribution of traffic across available transit provider paths as well as account for path congestion, performance, and other measurable metrics as part of the distribution. At the router level, the source network gateway router routes the packet to the destination network through the transit provider path over which the address prefix for the destination address is advertised. Further at the router level, a policy based routing configuration at the router level of the destination network causes responses to the source network packets to be routed over the same path through which the source network packets arrived.

As a result of the embodiments provided herein, servers are no longer directly reliant on network routers to resolve some of the issues that occur at the network level. The servers now have a proactive means with which to directly combat network issues. Specifically, if a server identifies packet loss or significant network delay occurring over a first transit provider path, the server can autonomously switch to a second transit provider path and resend the packets to resolve the issues.

The application controlled path selection implementation of some embodiments involves a set of network level configurations and application level configurations. These configurations override standard Border Gateway Protocol (BGP) operation without altering BGP operation at the network level. These configurations further provide bidirectional optimization for communications between a source network and a destination network, whereby a server in the destination network sends traffic over the same path selected by the source network server to reach the destination network or a similar path under control of the same transit provider (i.e., same transit) used by the source network server in reaching the destination network. For the purposes of the discussion that is to follow, the terms source and destination may be interchangeably used as a first network can be a source in a first communication that it initiates with a second network and the second network can be a source in a second communication that it initiates with the first network.

The network level configurations and application level configurations of some embodiments collaboratively assign a unique address or unique address prefix to each transit provider path connecting any two networks or nodes of the networks. The two networks can include first and second autonomous systems, first and second points-of-presence (PoPs) of a content delivery network (CDN), and any other networks that are reachable by way of an exterior gateway protocol.

The unique addressing provided by the configurations can involve Internet Protocol (IP) version 4 addressing, IPv6 addressing, or any IP address and port number combination, wherein the port number can be a Transmission Control Protocol (TCP) port number. IPv6 addressing is preferable because of the available address space that can be used in assigning unique addressing to each path between any two networks.

In some embodiments, the network level configurations and the application level configurations are performed at both the source network and the destination network. It is preferable for the source network and destination network to be operated by the same entity, although this is not necessary. Alternatively, the source network and the destination network may be under control of different entities working in concert to implement the network level and application level configurations.

A CDN infrastructure is ideally suited for implementing and realizing the advantages of the described embodiments, although it should be apparent that the implementation generally applies to any pair of networks that exchange any kind of traffic with one another. Thus, the CDN infrastructure is used herein as an exemplary architecture to illustrate the implementation and operation of the application controlled path selection embodiments set forth herein.

A CDN relies on a distributed architecture. The distributed architecture is comprised of a set of geographically separated PoPs. A set of servers operates within each PoP to cache and serve content to end users that are geographically proximate to a PoP. Therefore, while the PoPs are operated by a common entity, each PoP operates within a different network. PoPs frequently communicate with one another.

The communications may involve retrieving content that is not locally cached in one PoP from a neighboring PoP.

Figure 1:
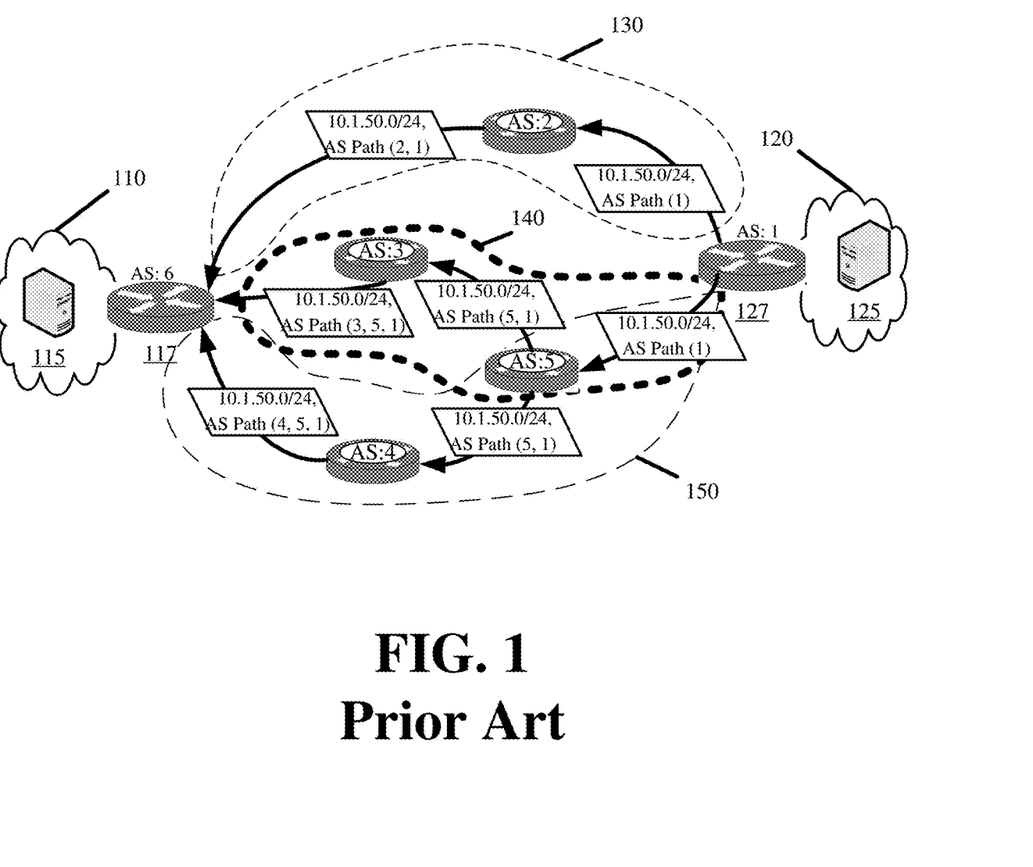
FIG. 1 conceptually illustrates traditional route advertising.
Figure 2:
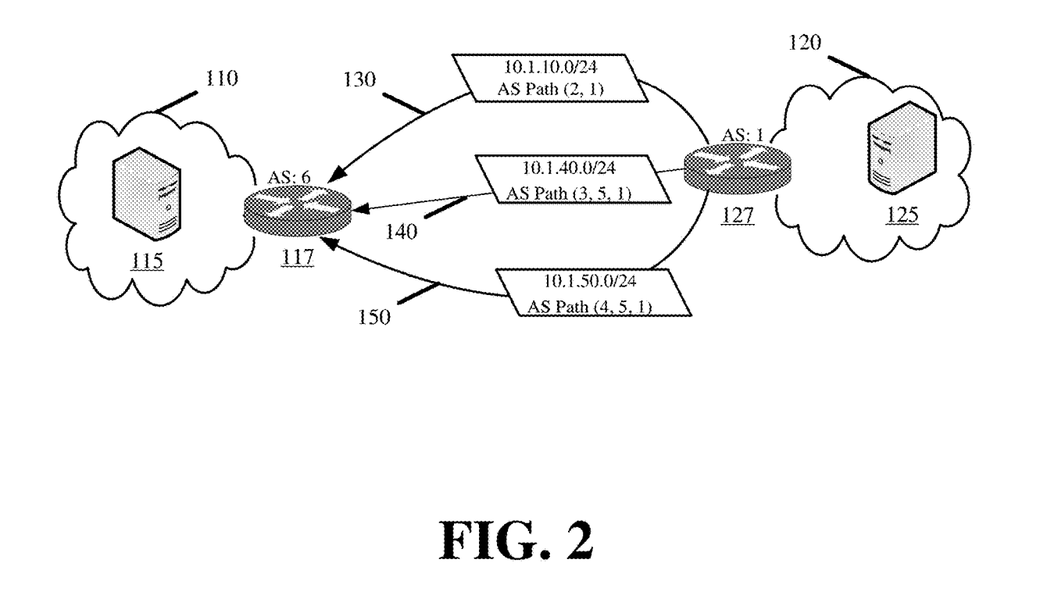
FIG. 2 conceptually illustrates the unique address assignment for different transit provider paths as part of the application controlled path selection embodiments set forth herein.

FIG. 1 conceptually illustrates traditional route advertising, whereas FIG. 2 conceptually illustrates the unique address assignment for different transit provider paths as part of the application controlled path selection embodiments set forth herein. Both figures illustrate a source network 110, a destination network 120, and several paths 130, 140, and 150 over which the source network 110 and destination network 120 can communicate with one another. The source network 110 has at least one server 115 and one gateway router 117 through which the server 115 sends and receives traffic from machines operating outside the source network 110. Similarly, the destination network 120 has at least one server 125 and one gateway router 127 through which the server 125 sends and receives traffic from machines operating outside the destination network 120. In these figures, it is assumed that each of the paths 130, 140, and 150 is provided by or under control of a different transit provider. Each path 130, 140, and 150 involves a specific or arbitrary traversal of network hops or routers that are under control of a single transit provider or that the single transit provider is permitted to use in passing traffic between the two networks.

Per traditional network routing illustrated by FIG. 1, the destination network gateway router 127 sends BGP update messages advertising only the address prefix for the destination network, rather than the different address prefixes as shown in FIG. 2, over each of the paths 130, 140, and 150. As shown in FIG. 1, routers along each path 130, 140, and 150 append their autonomous system (AS) number to the BGP update messages and pass the messages further down the path until reaching the source network gateway router 117. From the BGP update messages, the source network gateway router 117 identifies the destination network address prefix as being accessible through the three different paths 130, 140, and 150 with the source network gateway router 117 usually selecting the path (i.e., path 130 in FIG. 1) with the fewest hops (i.e., path that traverses the fewest AS numbers) as the optimal path with which to pass the packet from the source network server 115 to the destination network server 125.

In the embodiment illustrated by FIG. 2, network level configurations implemented on the destination network gateway router 127 cause the destination network gateway router 127 to send different BGP update messages across each of the paths 130, 140, and 150. The destination network gateway router 127 sends a first BGP update message over the first path 130 advertising that a first unique address prefix 10.1.10.0/24 is directly connected to or reachable from router 127. The destination network gateway router 127 sends a second BGP update message over the second path 140 advertising that a second unique address prefix 10.1.40.0/24 is directly connected to or reachable from router 127. Finally, the destination network gateway router 127 sends a third BGP update message over the third path 150 advertising that a third unique address prefix 10.1.50.0/24 is directly connected to or reachable from router 127.

It is worth noting that the first, second, and third address prefixes advertised by the destination network gateway router 127 in FIG. 2 all point back to the second network 120. Each address prefix is however advertised over only one of the different paths 130, 140, and 150 so as to make it appear to the network routers that the path over which the address prefix is advertised is the only path to reach the advertised addresses of the address prefix. Specifically, the source network gateway router 117 receives from its neighboring routers, the different BGP update messages sent from the destination network gateway router 127 identifying the different prefix reachable over each path 130, 140, and 150. In FIG. 2, the source network gateway router 117 is unaware that the different address prefixes advertised in the BGP update messages received over paths 130, 140, and 150 lead to the same network destination network 120. In FIG. 2, the source network gateway router 117 only knows that the first set of addresses of the first unique address prefix (e.g., 10.1.10.0/24) are reachable through path 130, the second set of addresses within the second unique address prefix (e.g., 10.1.40.0/24) are reachable through path 140, and the third set of addresses within the third unique address prefix (e.g., 10.1.50.0/24) are reachable through path 150. Therefore, if the source network server 115 addresses the packet to an address within the second unique address prefix advertised over the second transit provider path 140, the source network gateway router 117 receiving the packet has only one choice or path to route the packet to. The result is that the source network server 115 is able to usurp the path selection operation from the source network gateway router 117 without altering the routing function of the router 117.

Figure 3:
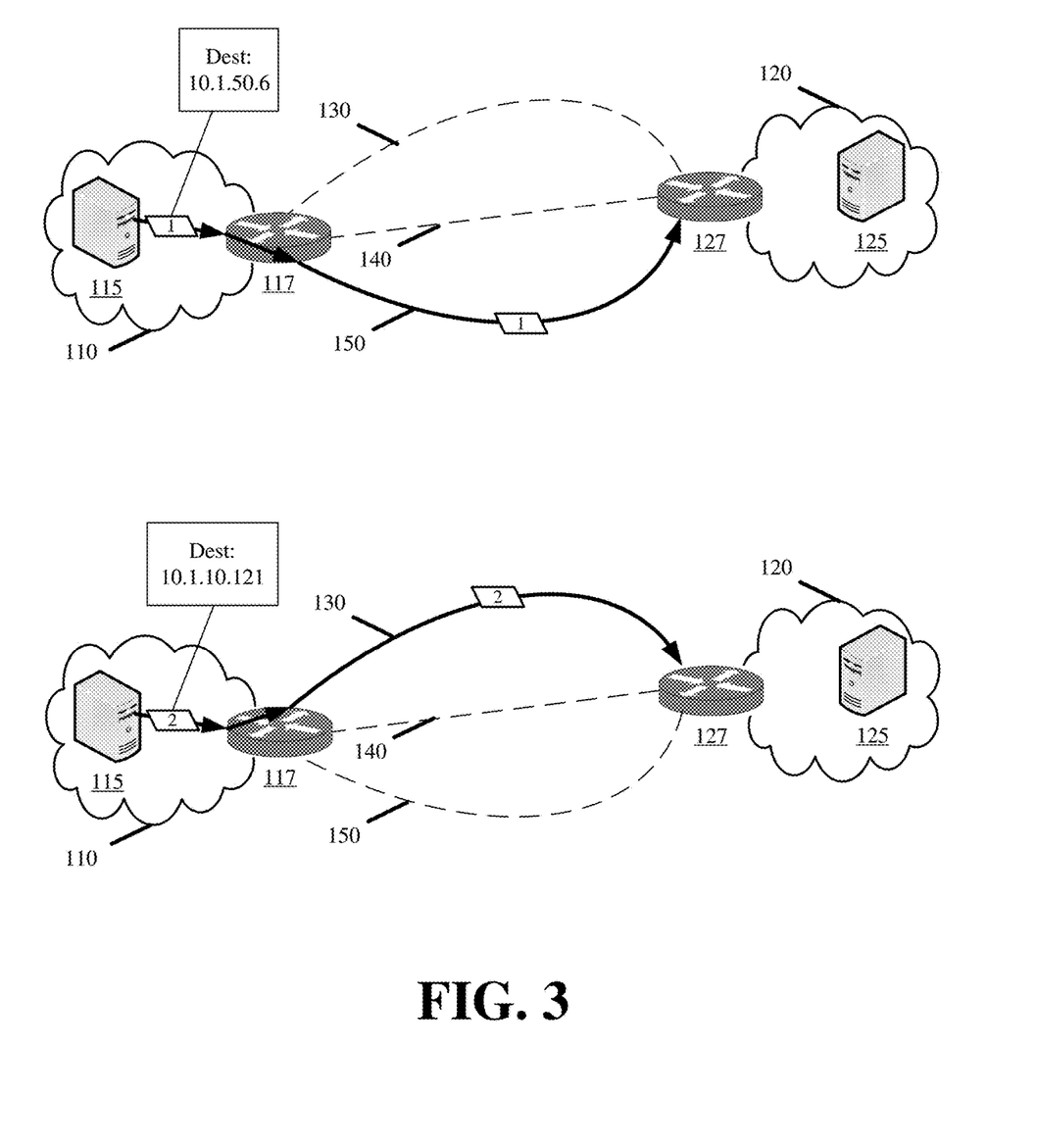
FIG. 3 illustrates the source network server leveraging the network level configurations performed in FIG. 2 in order to override path selection at the network level and perform path selection at the application level in accordance with some embodiments.

FIG. 3 illustrates the source network server 115 leveraging the network level configurations performed in FIG. 2 in order to override path selection at the network level and perform path selection at the application level in accordance with some embodiments. Once the network level configurations from FIG. 2 are configured, application level configurations can be configured to cause the source network server 115 to select between the different advertised addresses in order to specify which of the paths 130, 140, and 150 the source network server 115 wants its packets to be routed through in order to reach the destination network 120. Since each advertised address prefix is received over one specific path in FIG. 2, the source network gateway router 117 has no choice but to pass on the source network server 115 packets over the path that is associated with the destination address identified in the packets generated by the source network server 115.

In FIG. 3, the source network server 115 addresses a first packet to an address 10.1.50.6 that is within the third unique address prefix (i.e., 10.1.50.0/24) advertised by the destination network gateway router 127 over the third path 150. The source network server 115 passes the first packet to the source network gateway router 117. Based on the BGP update messages disseminated during the earlier performed network level configurations from FIG. 2, the source network gateway router 117 knows that address 10.1.50.6 is only reachable over the third path 150, and therefore routes the first packet over the third path 150.

The source network server 115 then addresses a second packet to an address 10.1.10.121 that is within the first unique address prefix (i.e., 10.1.10.0/24) advertised by the destination network gateway router 127 over the first path 130 in FIG. 2. In this case, the source network gateway router 117 knows that address 10.1.10.121 is only reachable over the first path 130, and therefore routes the second packet over the first path 130.

In some embodiments, the network level configurations and application level configurations impose bidirectional communication over the application level selected path or transit that is traversed by the selected path. Specifically, for any connection established between the source network server 115 and the destination network server 125, the destination network gateway router 127 is configured with policy based routing (PBR) rules causing the router 127 to send responses to any packets that the destination network server 125 receives from the source network server 115 over the same path or the same transit that the destination network server 125 receives those packets from the source network server 115. Thus from the illustration of FIG. 3, the destination network server 125, by routing of the destination network gateway router 127, sends a third packet over the third path 150 in response to the first packet that the destination network server 125 receives from the source network server 115 over the third path 150. In some embodiments, the destination network server 125, by routing of the destination network gateway router 127 sends the third packet over the same transit through which the third path 150 is established. In this case, the third packet is passed using routers or hops that under control or use of the same transit provider providing the third path 150, however one or more of the hops or routers traversed in passing the third packet from the destination network 120 to the source network 110 may differ from those traversed in passing the first packet from the source network 110 to the destination network 120. Similarly, the destination network server 125, by routing of the destination gateway server 127, would send a fourth packet over the first path 130 or the same transit through which the first path 130 is established in response to the second packet that the destination network server 125 receives from the source network server 115 over the first path 130.

As has been noted, the embodiments set forth herein are implemented by way of a concerted set of network level configurations and application level configurations. The network level configurations configure the network gateway routers of some embodiments to advertise to neighboring BGP routers the unique address prefixes assigned to each transit provider path. The network level configurations further configure the network gateway routers of some embodiments with policies that ensure communications associated with a given connection occur bidirectionally over the same path.

The application level configurations compliment the network level configurations. They do so by configuring the servers with policies for selecting a path prior to generating and submitting packets to the gateway routers for routing to an external network. Policies can be set so that a server selects the most efficient path to a destination network, provides some dynamic or consistent distribution of packets across available paths to a destination network, or bases the path selection determination on some specified criteria as some examples. The application level configurations also configure the servers with the unique address prefixes assigned to the different paths so that the servers can generate packets with addressing that specifies the intended path over which the packet is to be routed and can receive and respond properly to packets that are addressed to the path unique addresses rather than the server address.

Figure 4:
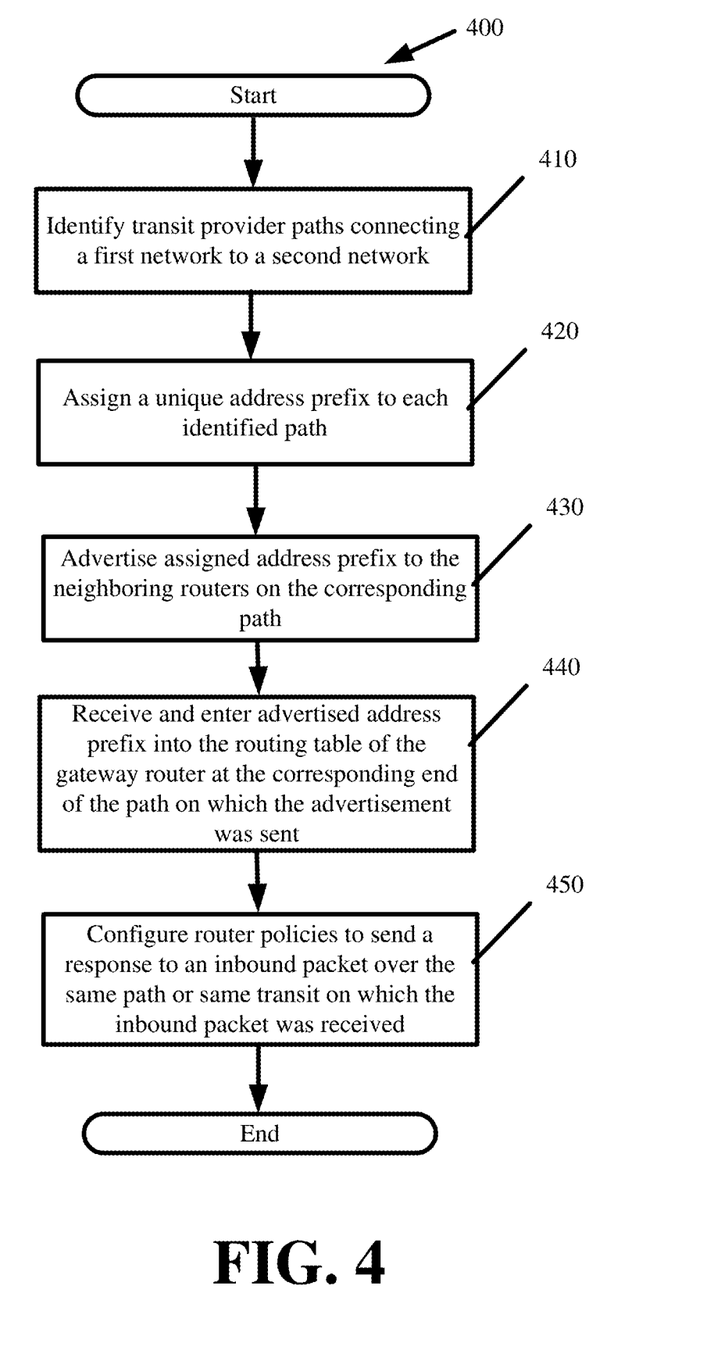
FIG. 4 presents a process for implementing the network level configurations in accordance with some embodiments.

FIG. 4 presents a process 400 for implementing the network level configurations in accordance with some embodiments. The process 400 commences by identifying (at 410) the gateways of first and second networks and the available transit provider paths connecting the gateways. The first network and second network can be different autonomous systems, PoPs, subnets, or any other network nodes that communicate by way of an exterior gateway protocol, such as BGP.

Next, the process assigns (at 420) an unused unique address prefix to each identified path. The address prefix assignment requires that the operator of the first and second networks have the address blocks being assigned be allocated for its own use, and that the address blocks be unique with respect to other addressing already in use by the operator. As an example, if the network operator operates four networks and each network has three paths connecting the network to the other three networks, then the network operator would need to set aside at least 12 blocks of addresses to uniquely address each of the paths. In some embodiments, commands or scripts executed on the routers assign the unique address prefixes to the different paths.

After assigning a unique address prefix to each identified path, the process advertises (at 430) the addressing to the neighboring routers on the corresponding path. In some embodiments, the first network gateway router advertises a first set of unique address prefixes across each path. The first set of unique address prefixes is then used by a server in the second network to specify a path selected by the second network server over which to send packets to the first network. To reciprocate, the second network gateway router advertises a different second set of unique address prefixes across each path. This second set of unique address prefixes is used by a server in the first network to specify a path selected by the first network server over which to send packets to the second network.

Figure 5:
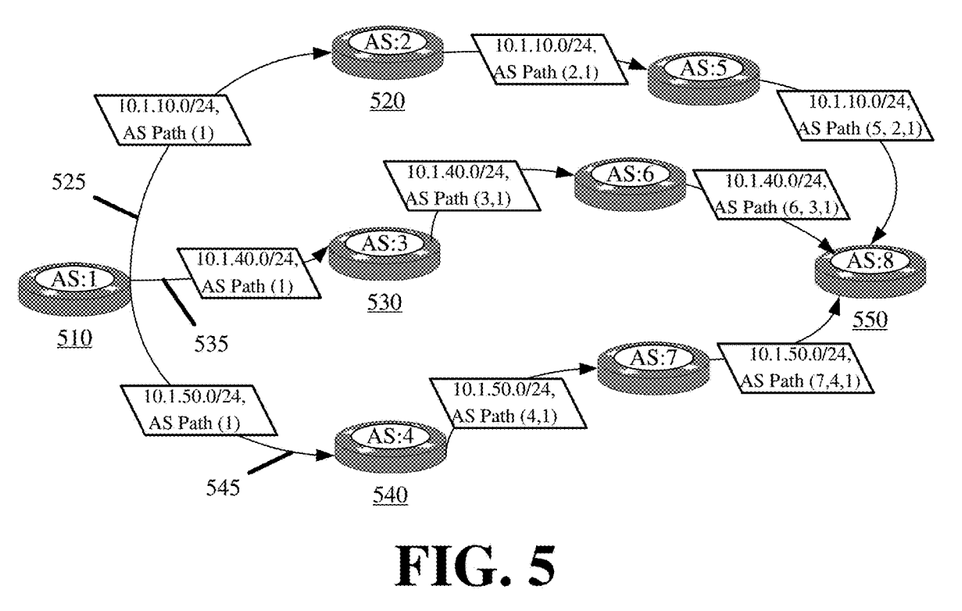
FIG. 5 illustrates a first network gateway router advertising a first set of unique address prefixes to a second network gateway router to enable application level path selection for a second network server sending packets to a first network server.

FIG. 5 illustrates a first network gateway router 510 advertising a first set of unique address prefixes to a second network gateway router 550 to enable application level path selection for a second network server sending packets to a first network server. As shown by FIG. 5, first network gateway router 510 advertises a first unique address prefix to a first neighboring router 520 on a first transit provider path 525, a second unique address prefix to a second neighboring router 530 on a second transit provider path 535, and a third unique address prefix to a third neighboring router 540 on a third transit provider path 545. Each of the neighboring routers 520, 530, and 540 then propagate the advertisements upstream. Eventually, the advertisements reach the second network gateway router 550. Thereafter, when a second network server operating in the same network as the second network gateway router 550 selects one of the paths and passes a packet addressed to one of the first, second, or third address blocks, the router 550 will know, based on the received advertisements, which path the address corresponds to and which path to route the packet through in order to reach the first network.

Figure 6:
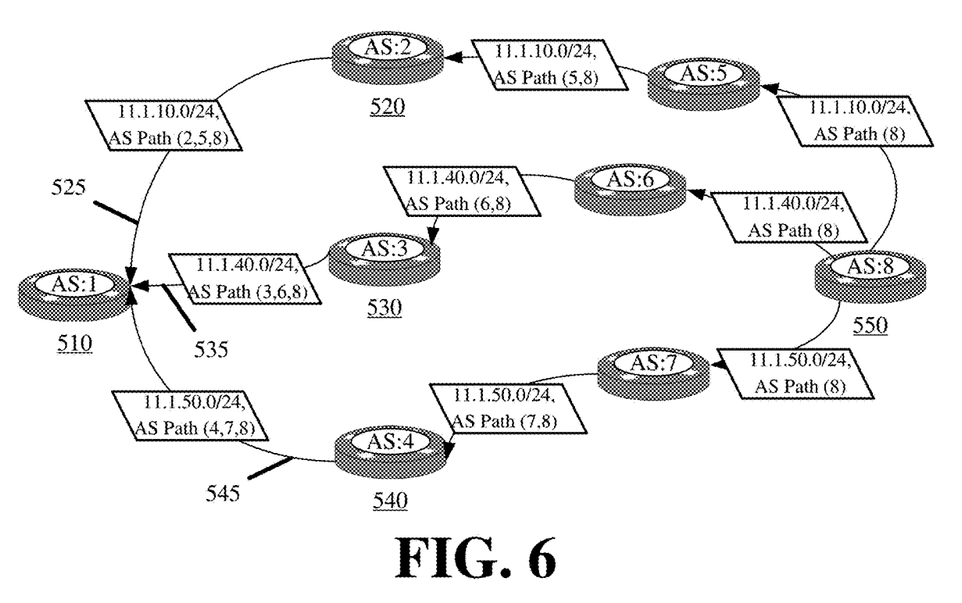
FIG. 6 illustrates the reciprocal address advertising performed by the second network gateway router.

FIG. 6 illustrates the reciprocal address advertising performed by the second network gateway router 550. In FIG. 6, the second network gateway router 550 advertises a second set of unique address prefixes over the same paths illustrated in FIG. 5 to the first network gateway router 510 in order to enable application level path selection by a server in the second network.

With reference back to process 400, after the unique path addressing is advertised (at 430), the advertisements are received and entered (at 440) into the routing table of the gateway router at the corresponding end of the path on which the advertisement was sent. These entries serve to override the router's path selection abilities for the purposes of the disclosed embodiments without affecting normal operations of the router, wherein the normal operations include any routing that does not involve the advertised unique address blocks.

The process further involves configuring (at 450) a set of policies on the gateway routers to enable the bidirectional flow of communications over the same path or the same transit of inbound packets. In some embodiments, the policies apply on a per connection basis. In other words, when a connection is established between a source and a destination and a first packet is passed from the source to the destination over a specific path or transit, the policies configure the destination network gateway router to send any subsequent packets associated with that connection over the same specific path or transit.

The application level configurations build upon the network level configurations. The application level configurations configure the servers to leverage the addressing scheme put in place by the network level configuration for purposes of performing path selection at the application level. In some embodiments, the application level configurations include policies that specify a desired distribution over the available transit provider paths, or that alternatively specify how a server determines an optimal path from the available transit provider paths.

Figure 7:
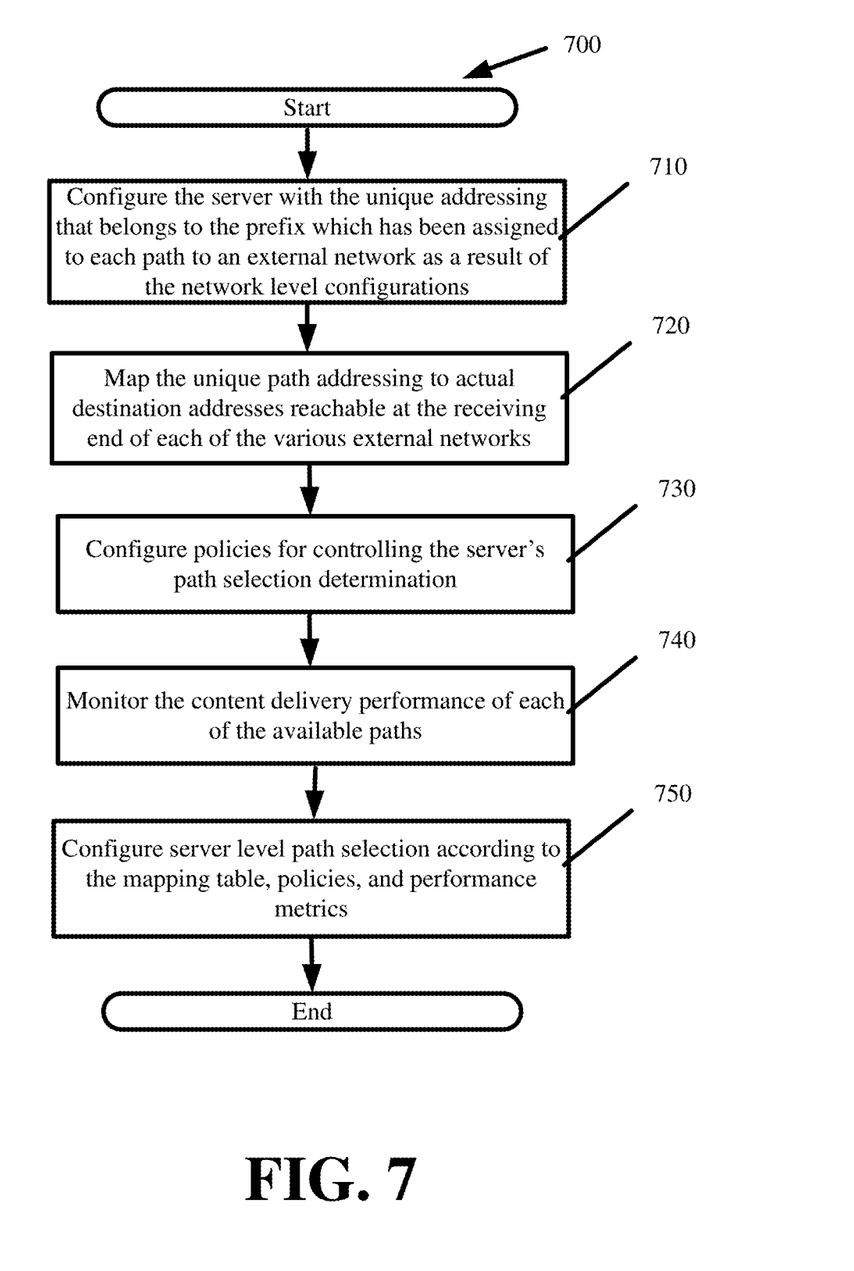
FIG. 7 presents a process describing the application level configurations of some embodiments.

FIG. 7 presents a process 700 describing the application level configurations of some embodiments. A first act of the application level configurations is configuring the server send operation to take advantage of the path addressing and perform application level path selection. To do so, the process configures (at 710) the server with the unique addressing that has been assigned to each path to an external network as a result of the network level configurations. The process further involves mapping (at 720) the unique path addressing to actual destination addresses reachable at the receiving end of each of the various external networks. For example, the mapping step maps a first unique address prefix 10.1.2.0/24 for a first destination network path and a second unique address prefix 10.1.3.0/24 for a second destination network path to an address 10.1.1.5 of a server operating in the destination network.

Next, the process configures (at 730) policies for controlling the server's path selection determination. More specifically, the policies control how the server distributes traffic over the different available paths to a destination or how the server selects an optimal path from the different available paths to a destination. The policies are described in greater detail below.

The process optionally monitors (at 740) the content delivery performance of each of the available paths and derives various performance metrics as a result of the monitoring. The monitoring can be passive or active. Passive monitoring involves using existing traffic flows to monitor path performance. Active monitoring involves injecting special purposed packets periodically on each of the paths to determine path performance. The monitoring can also be performed in a centralized or distributed fashion. Centralized monitoring can involve designating one machine within the PoP to monitor transit provider path performance to that PoP. Distributed monitoring can involve configuring each server of a PoP to track path quality using existing connections the server has established over each available transit provider path to that PoP. The monitoring results obtained from different paths can be compared against one or more performance thresholds or compared relative to one another.

In some embodiments, the monitored performance metrics are used in making the application level path selection as they enable the server in identifying which available path to a given destination offers the best performance. The final step in configuring the server send operation is to configure (at 750) the server to perform the application level path selection according to the mapping table, policies, and performance metrics prior to generating and disseminating packets to the gateway router for routing.

Figure 8:
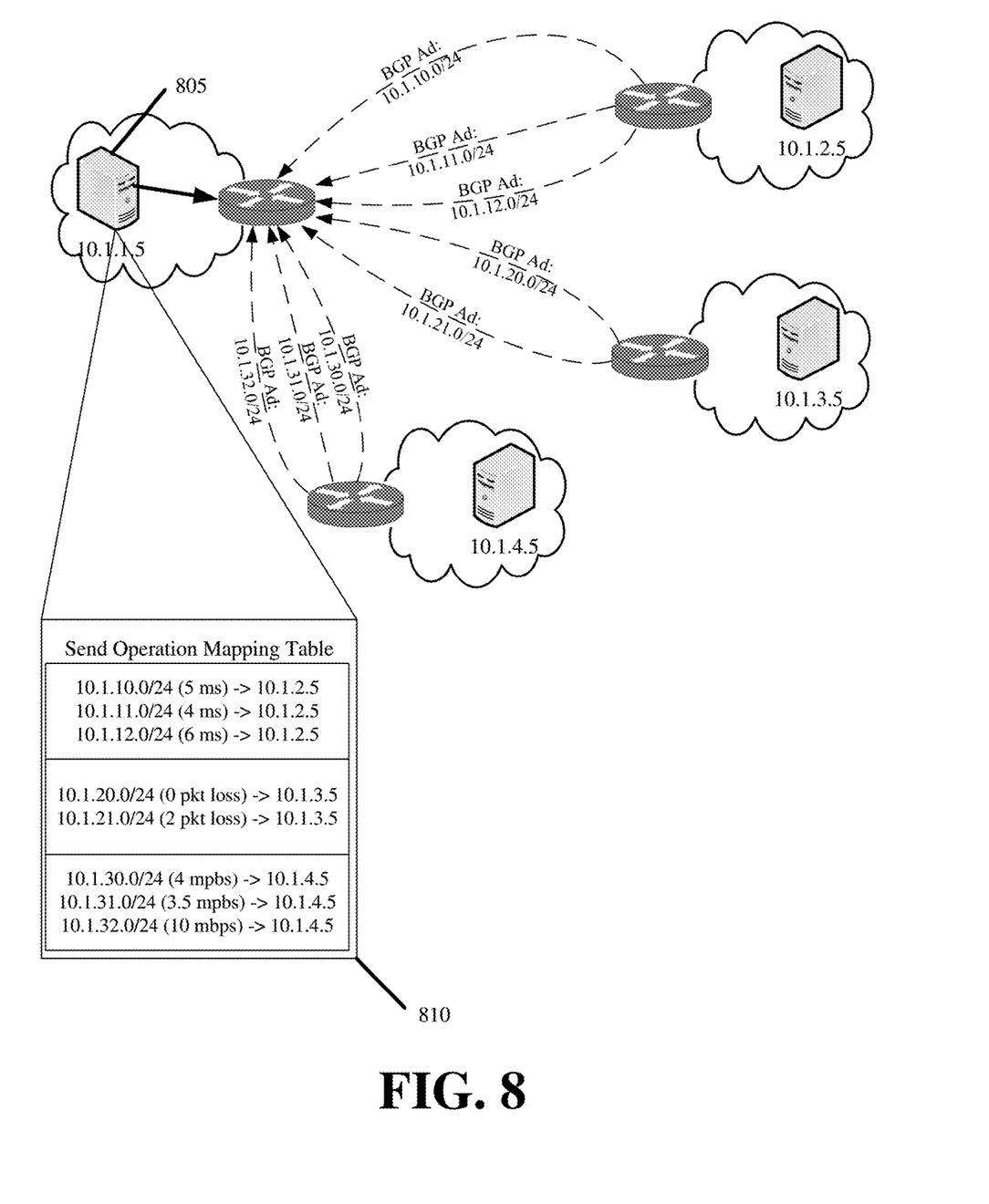
FIG. 8 conceptually illustrates configuring the server send operation in accordance with some embodiments.

FIG. 8 conceptually illustrates configuring the server send operation in accordance with some embodiments. The figure illustrates configuring a source network server 805 with a mapping table 810 that maps the unique path addresses to an actual destination address reachable at the receiving end of the addressed path. In some embodiments, the mapping table 810 includes various performance metrics for each transit provider path. The performance metrics identify performance of each path.

Figure 9:
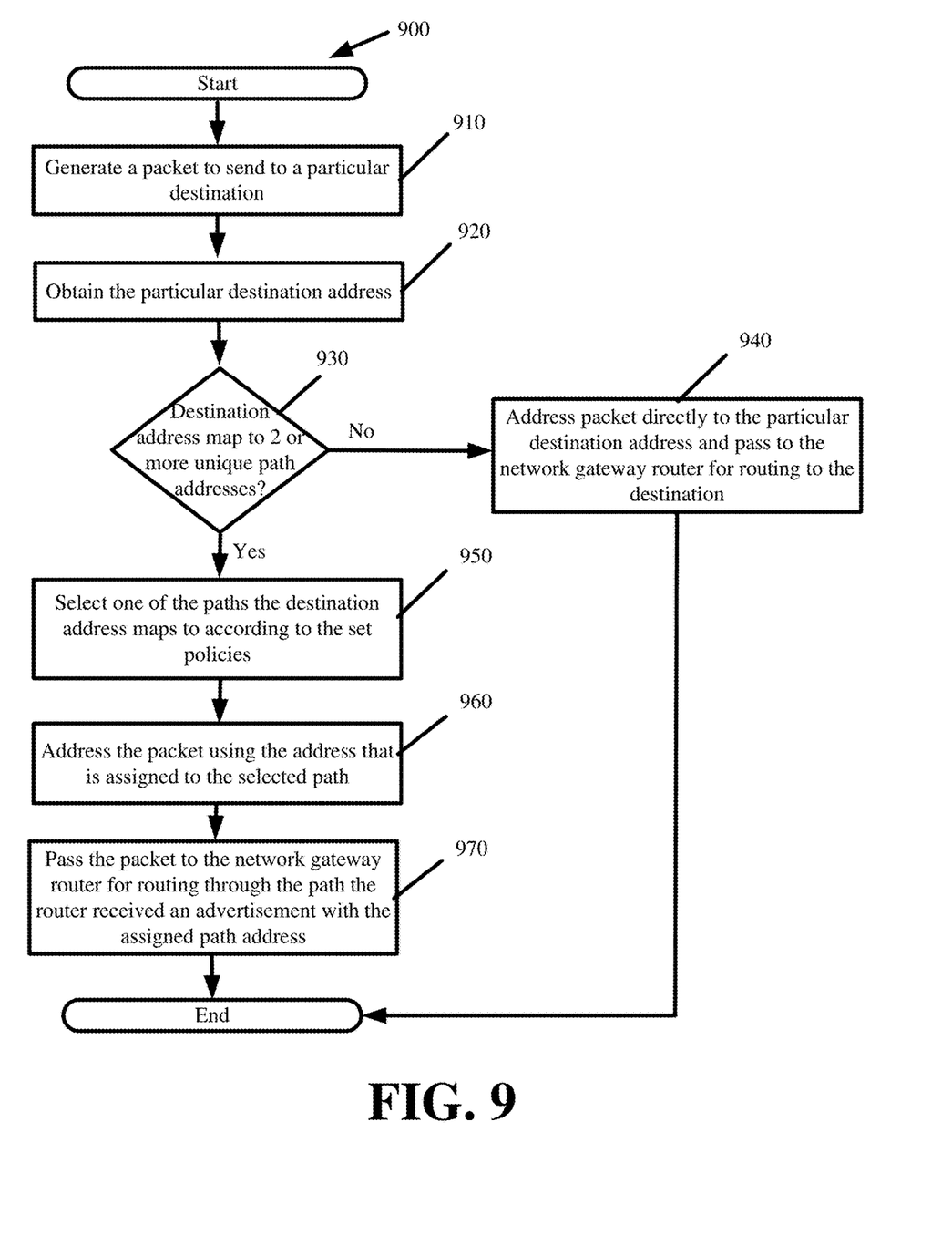
FIG. 9 presents a process with which a server configured with the application level configurations of some embodiments performs the application level path selection according to the mapping table, policies, and performance metrics.

FIG. 9 presents a process 900 with which a server configured with the application level configurations of some embodiments performs the application level path selection according to the mapping table, policies, and performance metrics. The process 900 commences when the server generates (at 910) a packet to send to a particular destination. The process obtains (at 920) the particular destination address. The particular destination address is typically either an IPv4 of IPv6 address and is obtained as result of Domain Name System (DNS) resolution.

The process determines (at 930) if application level path selection is enabled for that particular destination by identifying whether the particular destination address maps to two or more unique transit provider addresses or two or more unique transit provider addresses map to the particular destination address. The identification is made with a lookup of the particular destination address against the send operation mapping table.

If the mapping table has no entry for the particular destination address or the particular destination address does not map to any unique transit provider path addresses, the process continues by simply addressing (at 940) the packet to the particular destination address and passing the addressed packet to the network gateway router for routing to the destination. In this instance, standard networking protocols and BGP path selection is used to deliver the packet to the particular destination.

If the particular destination address maps to two or more unique transit provider addresses, the process selects (at 950) a path according to the set policies. The process then addresses (at 960) the packet using the address that is assigned to the selected path. The process passes (at 970) the packet to the network gateway router which then routes the packet through the path it received an advertisement with the assigned path address.

With reference back to process 700, the second act of the application level configurations is configuring the server receive operation. By way of the receive operation, the server recognizes and accepts packets that are addressed to the unique path addresses rather than the server's local address. To configure the server receive operation, the process configures (at 740) the server's loopback interface with the unique path addressing that external networks can use to route packets to the network in which the server operates. In some embodiments, the server's loopback interface is configured with each unique path address that was advertised from the gateway router operating in the same network as the server. In some embodiments, the server's loopback interface can be configured with a first subset of unique path addresses advertised from the server network when the server is only to receive packets addressed to the first subset of unique path addresses and a second server in the same network is to receive packets addressed to a second subset of unique path addresses advertised from the network.

Figure 10:
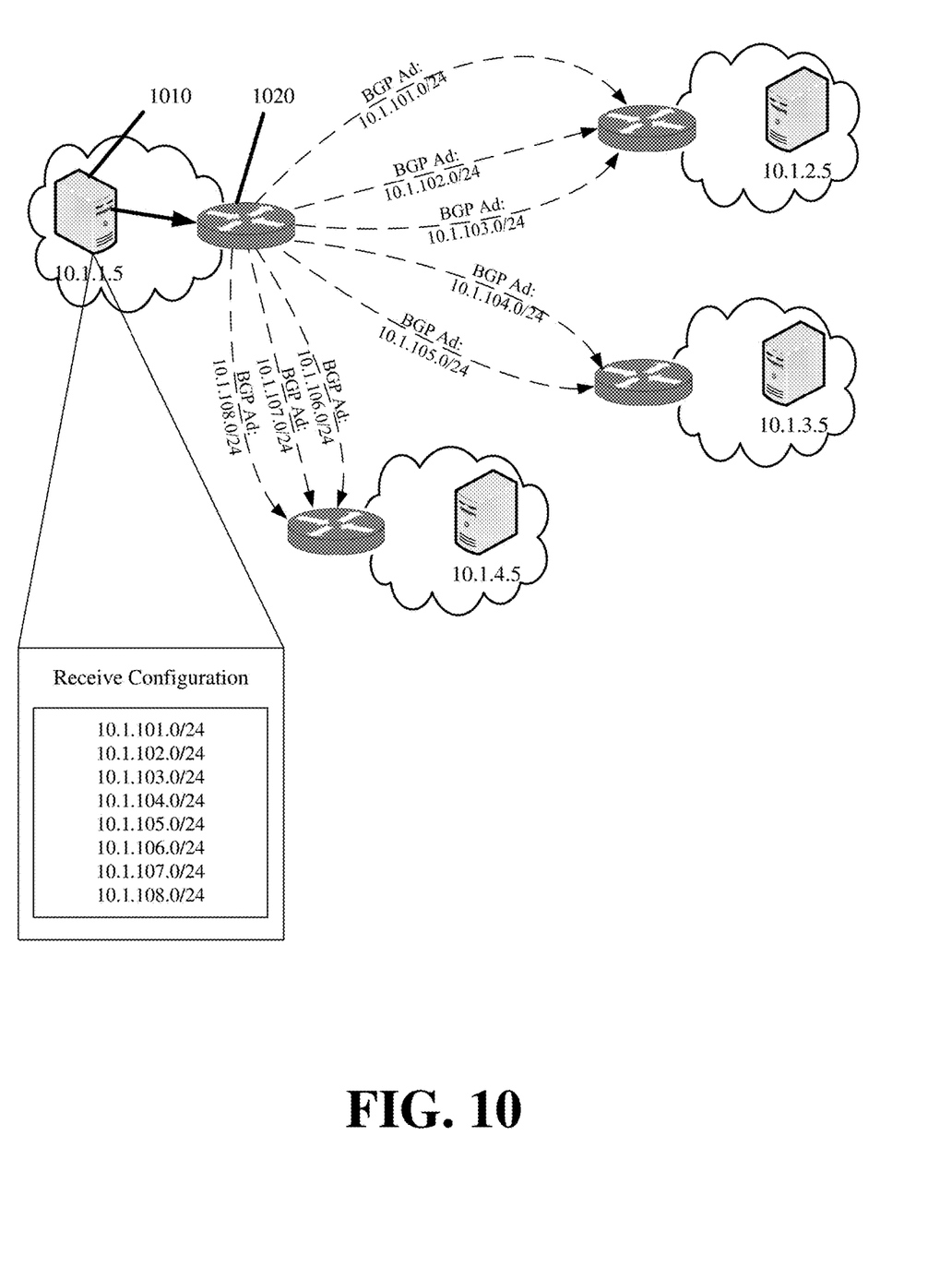
FIG. 10 conceptually illustrates configuring the server receive operation in accordance with some embodiments.

FIG. 10 conceptually illustrates configuring the server receive operation in accordance with some embodiments. The figure illustrates configuring the source network server 1010 with the unique path addressing that the gateway router 1020 operating within the same network as server 1010 advertises to external networks. Based on these configurations, the source network server 1010 is able to receive and accept packets that are addressed using the advertised path addressing instead of the server's assigned local address.

In some embodiments, multiple servers may operate in the same network. In some such embodiments, a load balancer is placed adjacent to the gateway router. The load balancer receives all inbound packets that are addressed using the unique path addressing from the gateway router. The load balancer can then distribute the packets amongst the servers according to a simplistic distribution, such as a round-robin distribution. Alternatively, the load balancer can perform a more complex distribution or consistent distribution, whereby the load balancer forwards packets directed to specific content, domains, or content providers to certain servers. Such a distribution can be accomplished by hashing an identifier from the received packet identifying the content, domain, or content provider. Once an initial packet is forwarded to a specific server and a connection or session is established between that specific server and another machine in an external network, the load balancer can readily forward subsequent packets associated with that connection or session to the same specific server.

In some embodiments, when a server receives a packet that is addressed using a unique path address instead of the server local address, the application level configurations cause the server generated response to include the unique path address instead of the server local address as the source address for the response. As an example referencing FIG. 10, if server 1010 receives a packet addressed to the unique path address 10.1.101.6 instead of the server address of 10.1.1.5, the server is configured to generate a response to that packet with the source address of 10.1.101.6.

As noted above, the application level configurations involve configuring policies that guide a server's path selection decision making. In some embodiments, the policies produce any of a round-robin distribution, load balancing distribution, failover distribution, least frequently used (LRU) distribution, most frequently used (MRU) distribution, heuristic based distribution, or more intelligent distributions of traffic across the available transit provider paths to a destination. The more intelligent distributions can select an optimal or desired transit provider path to a particular destination network based on criteria or performance metrics associated with each available path to the particular destination network, wherein the criteria or performance metrics include any of path performance, path cost, content quality-of-service, etc.

In some embodiments, a server configured with policies for a round-robin distribution establishes each new connection or session to a common destination over a next available transit provider path to that destination. Thus, all packets associated with a first established connection are passed over a first path to the common destination and all packets associated with a second established connection are passed over a different second path to the common destination.

In some embodiments, a server configured with policies for a load balanced distribution can establish new connections or sessions on a first path to a common destination until performance on that first path hits a specific threshold. Thereafter, the server establishes subsequent connections or sessions on a second path to the common destination, until again, performance on that second path hits a specified threshold. Other policies that provide a load balanced distribution can cause connections or sessions requesting specific first type of content (i.e., large media content) to occur over a first path to a specific destination with connections or sessions requesting specific second type of content (i.e., small image content) to occur over a second path to the same specific destination.

In some embodiments, the policies implement a failover distribution. In some such embodiments, the server configured with the failover distribution policies sends traffic that is intended for a common destination across a first transit provider path until the first path fails or performance across that path falls below a defined threshold. When a failure occurs or performance drops below the threshold, the server selects a second transit provider path to the common destination and subsequent traffic is passed to the destination along the second path for a specified time. After the specified time expires, the server can reselect the first path and resume transmission across the first path unless the failure remains or performance remains below the threshold. If the first path continues underperforming, the server will reselect the second path and increase the specified time with which to resume sending traffic over the first path. Should the second path also fail or underperform, the server can select a third transit provider path to the common destination and pass traffic across the third path for the specified time or increased time if additional failures are detected across the second path.

In some embodiments, the application level configurations configure policies for maximizing content delivery performance to a destination. In some such embodiments, the server continually monitors performance across each of the available paths to a common destination. Based on the monitoring, the server identifies the path providing the best performance to the common destination and directs subsequent traffic intended for the common destination over the optimal path by addressing the traffic to unique path address assigned to the optimal path.

The application level configurations can configure the server to monitor path performance in a variety of ways. In some embodiments, the server passively monitors path performance by monitoring the performance of connections or sessions already established over a particular path. Using various tools, such as the TCPInfo command, the server can obtain performance metrics for that particular path. The performance metrics can include any of latency measurements, packet loss, retransmissions, and round trip times as some examples. The server can also actively monitor the different paths to a given destination using pings or other injected traffic. If performance of a path is below a threshold, the server can select a different path. Alternatively, the server can compare the performance of each path to a given destination in order to identify the most optimal path.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a hardware processor including cellular telephones, smartphones, portable digital assistants, tablet devices, laptops, notebooks, desktop computers, and networked computers. Examples of computer-readable media include, but are not limited to, CD-ROMs, flash drives, RAM chips, hard drives, EPROMs, etc.

Figure 11:
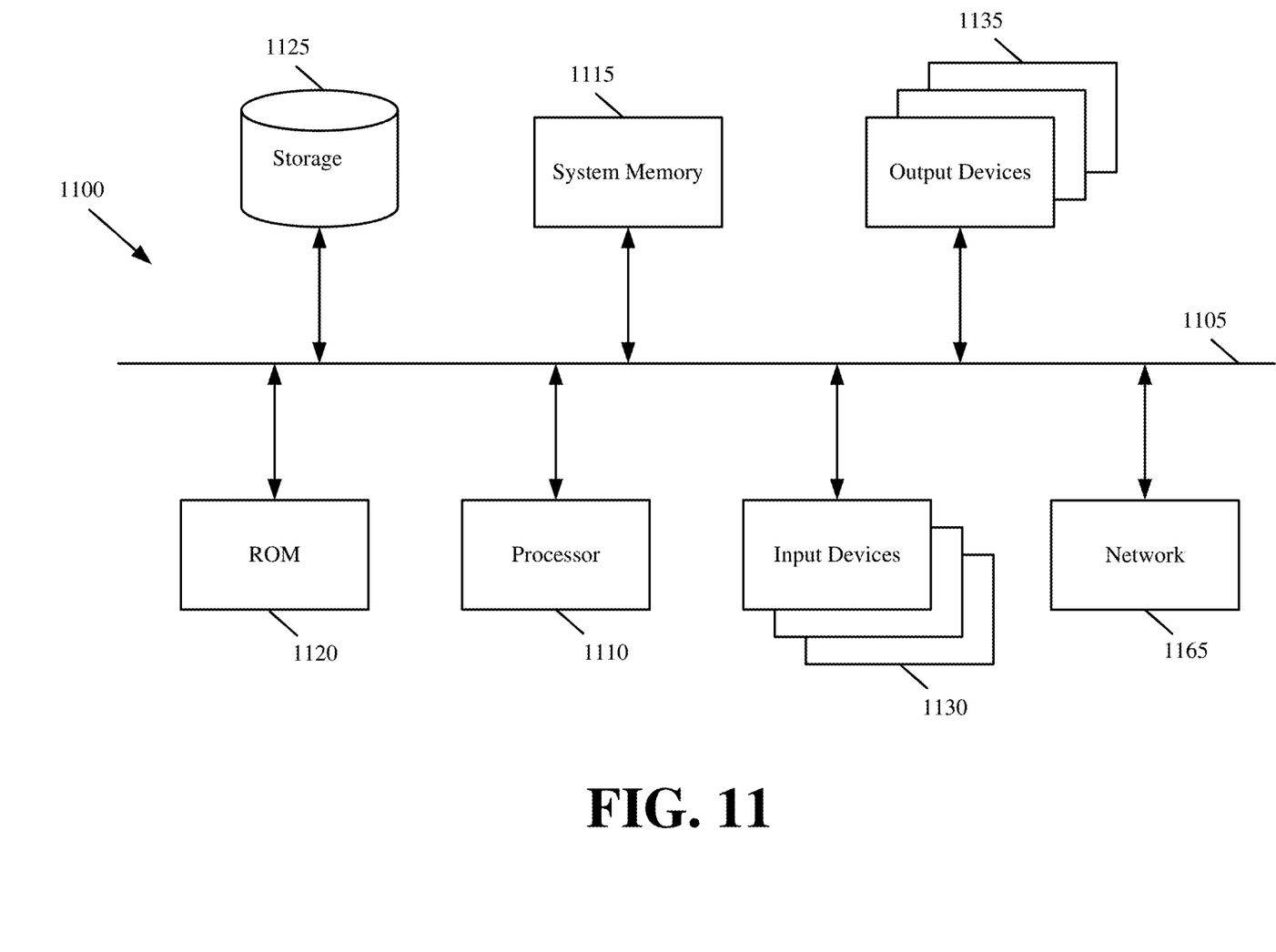
FIG. 11 illustrates a computer system or server with which some embodiments are implemented.

FIG. 11 illustrates a computer system or server with which some embodiments are implemented. Such a computer system includes various types of computer-readable mediums and interfaces for various other types of computer-readable mediums that implement the various methods and machines described above. Computer system 1100 includes a bus 1105, a processor 1110, a system memory 1115, a read-only memory 1120, a permanent storage device 1125, input devices 1130, and output devices 1135.

The bus 1105 collectively represents all system, peripheral, and chipset buses that communicatively connect the numerous internal devices of the computer system 1100. For instance, the bus 1105 communicatively connects the processor 1110 with the read-only memory 1120, the system memory 1115, and the permanent storage device 1125. From these various memory units, the processor 1110 retrieves instructions to execute and data to process in order to execute the processes of the embodiments described above. The processor 1110 is a processing device such as a central processing unit, integrated circuit, graphical processing unit, etc.

The read-only-memory (ROM) 1120 stores static data and instructions that are needed by the processor 1110 and other modules of the computer system. The permanent storage device 1125, on the other hand, is a read-and-write memory device. This device is a non-volatile memory unit that stores instructions and data even when the computer system 1100 is off. Some embodiments use a mass-storage device (such as a magnetic, solid-state disk, or optical disk and its corresponding disk drive) as the permanent storage device 1125.

Other embodiments use a removable storage device (such as a flash drive or solid-state disk) as the permanent storage device. Like the permanent storage device 1125, the system memory 1115 is a read-and-write memory device. However, unlike storage device 1125, the system memory is a volatile read-and-write memory, such as random access memory (RAM). The system memory stores some of the instructions and data that the processor needs at runtime. In some embodiments, the processes are stored in the system memory 1115, the permanent storage device 1125, and/or the read-only memory 1120.

The bus 1105 also connects to the input and output devices 1130 and 1135. The input devices enable the user to communicate information and select commands to the computer system. The input devices 1130 include alphanumeric keypads (including physical keyboards and touchscreen keyboards), pointing devices (also called "cursor control devices"). The input devices 1130 also include audio input devices (e.g., microphones, MIDI musical instruments, etc.). The output devices 1135 display images generated by the computer system. The output devices include printers and display devices, such as liquid crystal displays (LCD).

Finally, as shown in FIG. 11, bus 1105 also couples computer 1100 to a network 1165 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1100 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
tracking at a first server in a first network, a mapping of a destination in a different second network to (i) a first Internet Protocol (IP) address associated with a first network path connecting the first network to the second network, and (ii) a second IP address associated with a different second network path connecting the first network to the second network, wherein the first IP address is different than the second IP address;
generating, by the first server, a packet to send to the destination over a network path selected by the first server, wherein the generating comprises (i) setting the first IP address as a destination address of the packet based on the mapping and the first server selecting the first network path over the second network path, and (ii) setting the second IP address as the destination address of the packet based on the mapping and the first server selecting the second network path over the first network path; and
sending the packet from the first server.

2. The method of claim 1, wherein the destination is a second server in the second network, wherein the second server is accessible via a third IP address that is different than the first IP address for the first network path and the second IP address for the second network path.

3. The method of claim 1 further comprising receiving at the first server, a first route advertisement comprising the first IP address from the second network over the first network path, and a second route advertisement comprising the second IP address from the second network over the second network path.

4. The method of claim 1, wherein the generating further comprises:
determining a third IP address as an IP address of the destination;
using the first IP address, instead of the third IP address, as the destination address of the packet based on the first server selecting the first network path; and
using the second IP address, instead of the third IP address, as the destination address of the packet based on the first server selecting the second network path.

5. The method of claim 1 further comprising monitoring latency through the first network path based on a first packet sent to the first IP address, and monitoring latency through the second network path based on a second packet sent to the second IP address.

6. The method of claim 5 further comprising selecting one of the first network path and the second network path based on said monitoring of latency through the first network path and said monitoring of latency through the second network path.

7. The method of claim 1 further comprising assigning a third IP address for a response from the destination to the first server over the first network path, and assigning a fourth IP address for a response from the destination to the first server over the second network path.

8. The method of claim 1 further comprising changing routing rules on a gateway router of the first network to include (i) a first rule for forwarding the packet from the first server the destination address set as the first IP address to a next network hop along the first network path, and (ii) a second rule for forwarding the packet from the first server with the destination address set as the second IP address to a next network hop along the second network path.

9. A method comprising:
   mapping a first network address with which to access a first server in a first network to (i) a second network address that is advertised over a first network path connecting the first network to a remote second network, and (ii) a third network address that is advertised over a different second network path connecting the first network to the remote second network, wherein the second network address and the third network address are different than the first network address; and
   routing a packet from the remote second network to the first server in the first network over a network path selected by a second server in the remote second network generating the packet, wherein the routing comprises
   (i) sending the packet from the remote second network through the first network path to the first network based on the destination address of the packet set as the second network address, and
   (ii) sending the packet from the remote second network through the second network path to the first network based on the destination address of the packet set as the third network address.

10. The method of claim 9 further comprising receiving at the remote second network over the first network path, a first route advertisement comprising the second network address.

11. The method of claim 10 further comprising receiving at the remote second network over the second network path, a second route advertisement comprising the third network address, and wherein the mapping is based on said receiving of the first route advertisement and said receiving of the second route advertisement.

12. The method of claim 9, wherein the first network path comprises a first plurality of network hops with at least one network hop that is different than a second plurality of network hops of the second network path.

13. The method of claim 9 further comprising generating at the second server, the packet with the destination address (i) set to the second network address, instead of the first network address of the first server, in response to the mapping and selection of the first network path over the second network path by the second server, and (ii) set to the third network address, instead of the first network address of the first server, in response to the mapping and selection of the second network path over the first network path by the second server.

14. A method comprising:
   storing at a particular server in a source network, a first address of a first server in a remote first network, and a second address of a second server in a different remote second network;
   selecting by the particular server, a first network path from a first plurality of network paths, that connects the remote first network to the source network for a first packet targeting the first server;
   sending the first packet to the first server in the remote first network over the selected first network path by changing the destination address of the first packet from the first address of the first server to a third address advertised over the first network path from the remote first network, wherein the third address is different than the first address;
   selecting by the particular server, a second network path from a second plurality of network paths, that connects the remote second network to the source network, for a second packet targeting the second server; and
   sending the second packet to the second server in the remote second network over the selected second network path by changing the destination address of the second packet from the second address of the second server to a fourth address advertised over the second network path from the remote second network, wherein the fourth address is different than the second address.

15. The method of claim 14, wherein each network path of the first plurality of network paths is associated with a different Internet Protocol (IP) address than the first address of the first server, and wherein each network path of the second plurality of network paths is associated with a different IP address than the second address of the second server.

16. The method of claim 14 further comprising receiving a different route advertisement over each network path of the first plurality of network paths, and a different route advertisement over each network path of the second plurality of network paths.

17. The method of claim 16, wherein each route advertisement comprises a different IP address.

* * * * *